US009323533B2

(12) United States Patent
Ven et al.

(10) Patent No.: US 9,323,533 B2
(45) Date of Patent: Apr. 26, 2016

(54) SUPERVISOR MODE EXECUTION PROTECTION

(75) Inventors: Adriaan Van De Ven, Portland, OR (US); Baiju V. Patel, Portland, OR (US); Asit K. Mallick, Saratoga, CA (US); Gilbert Neiger, Portland, OR (US); James S. Coke, Haifa (IL); Martin G. Dixon, Portland, OR (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 13/997,857

(22) PCT Filed: Dec. 29, 2011

(86) PCT No.: PCT/US2011/067838
§ 371 (c)(1),
(2), (4) Date: Jun. 25, 2013

(87) PCT Pub. No.: WO2013/101059
PCT Pub. Date: Jul. 4, 2013

(65) Prior Publication Data
US 2015/0199198 A1    Jul. 16, 2015

(51) Int. Cl.
| G06F 21/00 | (2013.01) |
| H04L 29/06 | (2006.01) |
| G06F 9/30 | (2006.01) |
| G06F 12/02 | (2006.01) |
| G06F 12/10 | (2016.01) |
| G06F 12/14 | (2006.01) |
(Continued)

(52) U.S. Cl.
CPC ........ *G06F 9/30189* (2013.01); *G06F 9/30043* (2013.01); *G06F 12/0292* (2013.01); *G06F 12/1009* (2013.01); *G06F 12/1491* (2013.01)

(58) Field of Classification Search
CPC ............ G06F 9/30189; G06F 9/30043; G06F 12/1491; G06F 12/1009; G06F 12/0292
See application file for complete search history.

(56) References Cited

U.S. PATENT DOCUMENTS

| 2002/0082824 A1* | 6/2002 | Neiger et al. ..................... 704/2 |
| 2002/0087853 A1 | 7/2002 | Singh et al. |

(Continued)

FOREIGN PATENT DOCUMENTS

| EP | 0656592 A1 * | 6/1995 | .......... G06F 12/1441 |
| TW | 200836064 A | 9/2008 | |

(Continued)

OTHER PUBLICATIONS

Fischer, Stephen; "Supervisor Mode Execution Protection"; 2nd Annual NSA Trusted Computing Conference & Exposition; Intel Corporation; Sep. 21, 2011; pp. 1-10.*

(Continued)

*Primary Examiner* — Andrew Nalven
*Assistant Examiner* — Courtney Fields
(74) *Attorney, Agent, or Firm* — Thomas R. Lane

(57) ABSTRACT

Apparatuses and methods for supervisor mode execution protection are disclosed. In one embodiment, a processor includes an interface to access a memory, execution hardware, and control logic. A region in the memory is user memory. The execution hardware is to execute an instruction. The control logic is to prevent the execution hardware from executing the instruction when the instruction is stored in user memory and the processor is in supervisor mode.

17 Claims, 2 Drawing Sheets

(51) Int. Cl.
*G06F 9/455* (2006.01)
*G06F 17/28* (2006.01)

(56) References Cited

U.S. PATENT DOCUMENTS

| | | | |
|---|---|---|---|
| 2003/0212897 A1* | 11/2003 | Dickerson et al. | ............ 713/200 |
| 2004/0168047 A1 | 8/2004 | Fukai et al. | |
| 2010/0169601 A1 | 7/2010 | Funk et al. | |

FOREIGN PATENT DOCUMENTS

| | | |
|---|---|---|
| TW | 200903255 A | 1/2009 |
| TW | 200949557 A | 12/2009 |
| TW | 200951980 A | 12/2009 |
| TW | 201015323 A | 4/2010 |
| TW | 201042455 A | 12/2010 |
| TW | 201042489 A | 12/2010 |
| TW | 201115334 A | 5/2011 |
| TW | I342492 A | 5/2011 |
| WO | 2013/101059 A1 | 7/2012 |

OTHER PUBLICATIONS

Office Action Received for Taiwanese Patent Application No. 101149780 mailed on Nov. 20, 2014, 10 pages of Office Action and 9 pages of English Translation.
International Search Report and Written Opinion received for International Application No. PCT/US2011/067838, mailed on Sep. 19, 2012, 9 pages.
Varghese et al., "Intel Developer Forum 2011", Sep. 13, 2011.
International Preliminary Report on Patentability received for PCT Patent Application No. PCT/US2011/067838, mailed on Jul. 10, 2014, 6 pages.
Office Action Received for Taiwanese Patent Application No. 101149780 mailed on Feb. 13, 2015, 7 pages of Office Action and 6 pages of English Translation.
Office Action Received for Chinese Patent Application No. 201180076153.9 mailed on Nov. 23, 2015, 8 pages of Office Action and 5 pages of English Translation.

* cited by examiner

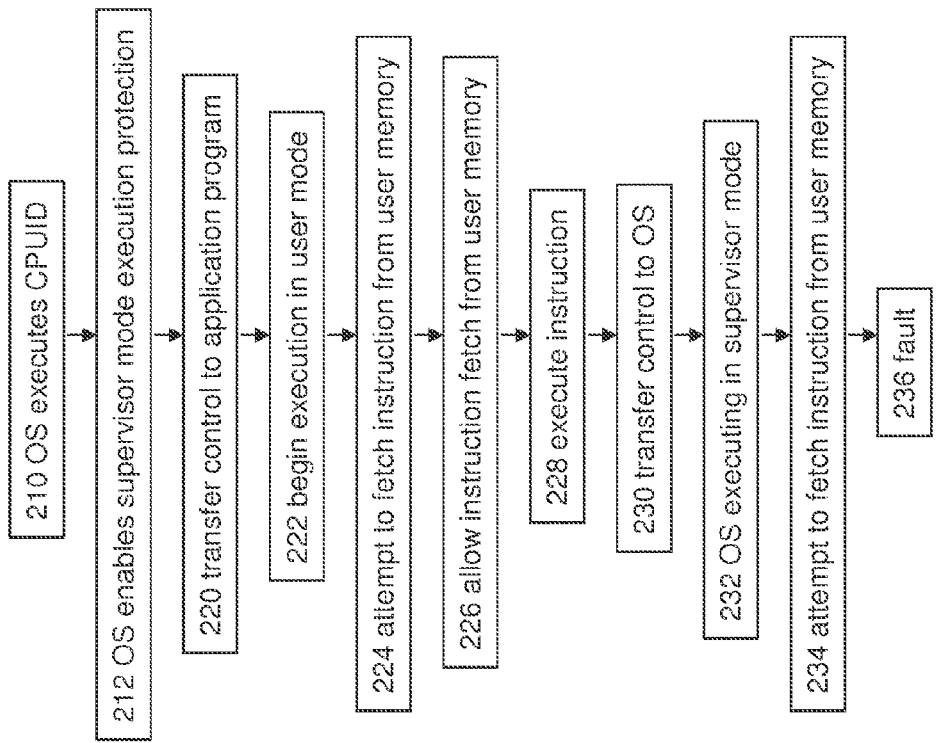

SUPERVISOR MODE EXECUTION PROTECTION

BACKGROUND

1. Field

The present disclosure pertains to the field of information processing, and more specifically, to the field of information processing system security.

2. Description of Related Art

Memory based attacks are a significant threat to the security of information processing in systems. Some such attacks involve storing malicious code, such as a virus or a worm, or malicious data in the memory of a computer system, then exploiting bugs and/or buffer overflows while running legitimate programs to transfer control to the malicious code or use the malicious data. A commonly used attack, known as a privilege escalation attack, involves storing attack code in application memory, then exploiting a vulnerability in kernel code to jump to the attack code.

BRIEF DESCRIPTION OF THE FIGURES

The present invention is illustrated by way of example and not limitation in the accompanying figures.

FIG. 2 illustrates a method for supervisor mode execution protection according to an embodiment of the present invention.

DETAILED DESCRIPTION

Figure 1:
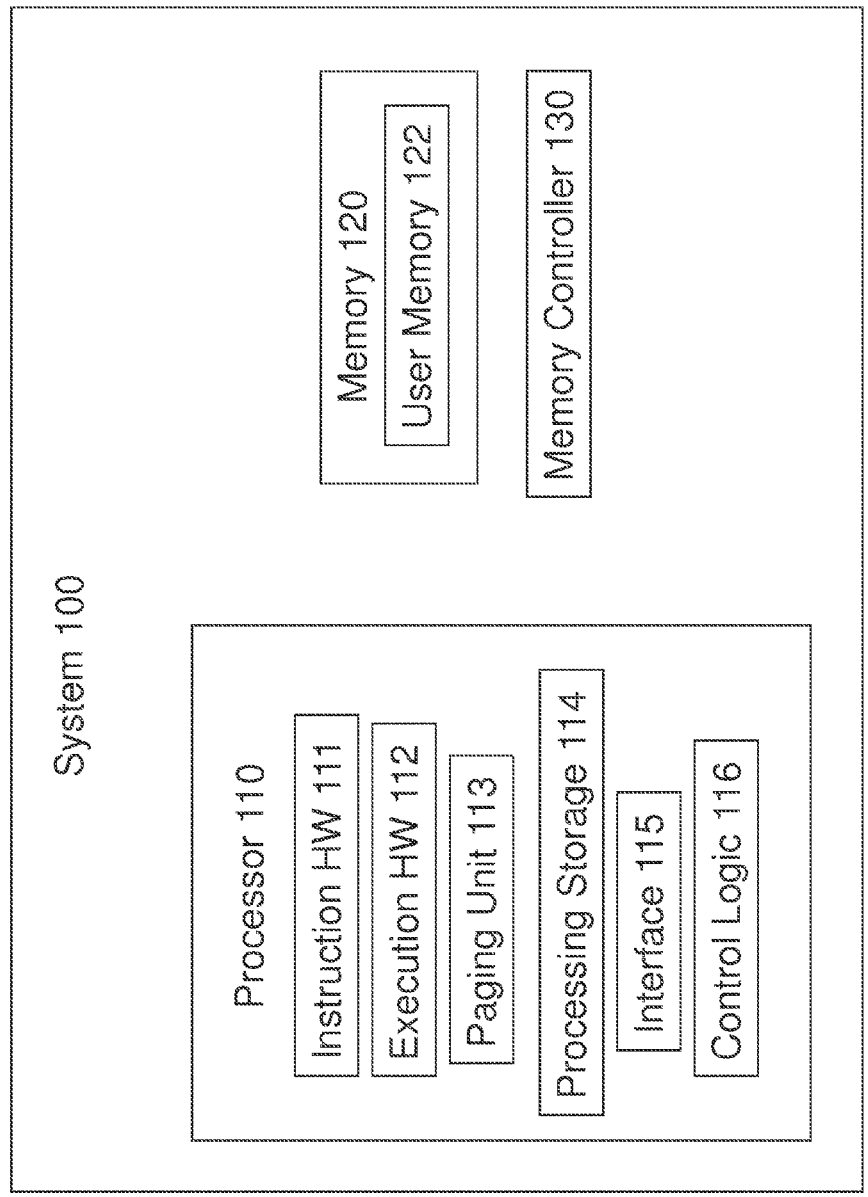
FIG. 1 illustrates a system and a processor in which an embodiment of the present invention may be present and/or operate.

The following description describes embodiments of techniques for supervisor mode execution protection. In the following description, specific details such as processor and system configurations may be set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention.

Embodiments of the present invention provide for using an attribute assigned to memory pages to provide supervisor mode execution protection. Techniques according to embodiments of the present invention may be implemented within any approach to memory management, including page-based memory management data structures, nested page-based memory management data structures used by virtualization technologies, and parallel access data structures.

FIG. 1 illustrates system 100, an information processing system in which an embodiment of the present invention may be present and/or operate. System 100 may represent any type of information processing system, such as a server, a desktop computer, a portable computer, a set-top box, a hand-held device, or an embedded control system. System 100 includes processor 110, memory 120, and memory controller 130. Systems embodying the present invention may include any other components or other elements, including any number of additional processors and/or memories. Any or all of the components or other elements in any system embodiment may be connected, coupled, or otherwise in communication with each other through any number of buses, point-to-point, or other wired or wireless connections.

Processor 110 may represent any type of processor, including a general purpose microprocessor, such as a processor in the Core® Processor Family, or other processor family from Intel Corporation, or another processor from another company, or any other processor for processing information according to an embodiment of the present invention. Processor 110 may include any number of execution cores and/or support any number of execution threads, and therefore may represent any number of physical or logical processors, and/or may represent a multi-processor component or unit.

Processor 110 supports execution of software at different privilege levels, according to any known approach. For example, processor 110 may recognize four privilege levels, which may be labeled zero to four, where the higher number means less privilege. The four privilege levels may be pictured as rings of protection, with privilege level zero, in the center, is intended for executing operating system ("OS") kernel level code, levels one and two are intended for executing OS services code, and level four, the outermost ring, is intended for executing application code.

Memory 120 may represent any static or dynamic random access memory, semiconductor-based read only or flash memory, magnetic or optical disk memory, any other type of medium readable by processor 110 and/or other elements of system 100, or any combination of such mediums. Memory controller 130 may represent a controller for controlling access to memory 120 and maintaining its contents. In an embodiment, memory controller 130 may be integrated onto the same integrated circuit as processor 110.

According to embodiments of the present invention, memory 120 may include user memory 122, which may be locations and/or regions referred to as application or user memory, which is intended to store instructions and data for used by application software. These locations and/or regions may be labeled as application memory according to any known technique. In an embodiment, each such location may include a bit or field which may store a certain value to indicate that it is user memory. In an embodiment, an entry at a higher level in a paging or other memory hierarchy may include a bit or field which may store a certain value to indicate that all lower level pages or other regions to which it may refer are user memory. For example, pages may be designated as user memory in a page directory entry and/or a translation lookaside buffer ("TLB") entry using a user/supervisor flag bit. In an embodiment, registers, tables, or other data structures may be used to designate a range or ranges of memory 120 designated as user memory.

Processor 110 may include instruction hardware 111, execution hardware 112, paging unit 113, processing storage 114, interface 115, and control logic 116, plus any other desired units or elements.

Instruction hardware 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution hardware 112. In an embodiment, one of the instructions types may be an identification instruction, to which processor 110 is designed to respond with information to identify processor 110 or anything about processor 110. For example the identification instruction may be the CPUID instruction in the instruction set architecture of the Intel® Core® Processor Family. In response to this instruction, processor 110 may return information that includes an indication that processor 110 supports supervisor mode execution protection according to an embodiment of the present invention.

Execution hardware 112 may include any circuitry, structure, or other hardware, such as an arithmetic unit, logic unit, floating point unit, shifter, etc., for processing data and executing instructions, micro-instructions, and/or micro-operations.

Paging unit 113 may represent any circuitry, structure, or other hardware, such as a TLB for translating addresses with which processor 110 accesses memory 120. Paging unit 113 may perform address translations, for example the translation of a logical or linear address to a physical address, according to any known memory management technique. To perform address translations, paging unit 113 refers to one or more data structures stored in processor 110, memory 120, any other storage location in system 100 not shown in FIG. 1, and/or any combination of these components and locations. The data structures may include page directories and page tables according to the architecture of the Core® Processor Family, as modified according to embodiments of the present invention, and/or a table stored in a TLB.

In one embodiment, paging unit 113 receives a linear address provided by an instruction to be executed and/or of data to be fetched by processor 110. Paging unit 113 uses portions of the linear address as indices into hierarchical tables, including page tables. The page tables contain entries, each including a field for a base address of a page in memory 120. Any page size (e.g., 4 kilobytes) may be used within the scope of the present invention. Therefore, the linear address in used by a program to access memory 120 may be translated to a physical address used by processor 110 to access memory 120.

Processing storage 114 may represent any type of storage usable for any purpose within processor 110, for example, it may include any number of data registers, instruction registers, status registers, other programmable or hard-coded registers or register files, or any other storage structures. In an embodiment, processing storage 114 may include a control register according to the architecture of the Core® Processor Family (e.g., CR4), which may include a programmable bit location or another size field to be used to enable supervisor mode execution protection according to embodiments of the present invention. For example, operating system software or other system software may perform a write to CR4 to set (e.g., write to a value of '1') a supervisor mode execution protection enable bit in CR4 to enable the feature. In one embodiment, software executing instructions at a more privileged privilege level (e.g., rings 0, 1, or 2) may be referred to as running in supervisor mode and software executing at a less privileged privilege level (e.g., ring 4) may be referred to as running in user mode.

Interface unit 115 may represent any circuitry, structure, or other hardware, such as a bus unit or any other unit, port, or interface, to allow processor 110 to communicate with memory 120 through any type of bus, point to point, or other connection, directly or through any other component, such as a chipset or memory controller.

Control logic 116 may represent microcode, programmable logic, hard-coded logic, or any other type of logic to control the operation of the units and other elements of processor 110 and the transfer of data within processor 110. Control logic 116 may cause processor 110 to perform or participate in the performance of method embodiments of the present invention, such as the method embodiments described below, for example, by causing processor 110 to execute instructions received by instruction hardware 111 and micro-instructions or micro-operations derived from instructions received by instruction hardware 111.

According to embodiments of the present invention, processor 100 may execute instructions from user memory when operating in user mode, but processor 100 cannot execute instructions from user memory when operating in supervisor mode. This feature may be implemented with control logic mode that causes a fault when instruction unit 111 attempts to fetch an instruction from user memory when processor 100 is executing code in supervisor mode.

FIG. 2 illustrates an embodiment of the present invention in a method, method 200, for supervisor mode execution protection. The description of FIG. 2 may refer to elements of FIG. 1 but method 200 and other method embodiments of the present invention are not intended to be limited by these references.

In block 210, OS software running on processor 110 may execute a CPUID instruction to determine that processor 110 supports a supervisor mode execution protection feature according to an embodiment of the present invention. In box 212, the OS software may execute a write to CR4 to enable the supervisor mode execution protection feature.

In box 220, the OS software may transfer control to an application program. In box 222 the application program may begin execution in user mode. In box 224, the application may attempt to fetch an instruction from user memory. In box 226, the application is allowed to fetch the instruction from user memory. In box 228, the instruction is executed.

In box 230, control is transferred from the application program to the OS software. In box 232, the OS software continues running in supervisor mode. In box 234 the OS software attempts to fetch an instruction from user memory. In box 236, the attempt to fetch an instruction from user memory while in supervisor mode causes a fault, so the instruction cannot be fetched or executed.

Within the scope of the present invention, method 200 may be performed in a different order than that shown in FIG. 2, with illustrated boxes omitted, with additional boxes added, or with a combination of reordered, omitted, or additional boxes.

Thus, techniques for supervisor mode execution protection are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
    an interface to access a memory, wherein a region in the memory is user memory;
    execution hardware to execute an instruction;
    control logic to prevent the execution hardware from executing the instruction when the instruction is stored in user memory and the processor is in supervisor mode;
    a paging unit, wherein the paging unit is to translate a linear address to a physical address using a page table hierarchy, and the region may be designated as user memory by a flag at any level in the page table hierarchy;

and wherein the execution unit is also to execute a processor identification instruction by returning an indication that the processor includes control logic to prevent the processor from executing from user memory when the processor is in supervisor mode.

2. The processor of claim 1, further comprising instruction hardware to fetch the instruction, wherein the control logic is to prevent the execution hardware from executing the instruction by preventing the instruction hardware from fetching the instruction from user memory when the processor is in supervisor mode.

3. The processor of claim 1, wherein the processor is in supervisor mode when executing software in a privilege level higher than a lowest privilege level.

4. The processor of claim 1, further comprising processing storage including a programmable storage location to enable the control logic to prevent the processor from executing from user memory when the processor is in supervisor mode.

5. A method comprising:
attempting, by software running on a processor in supervisor mode, to execute an instruction;
preventing the processor from executing the instruction when the instruction is stored in user memory;
a paging unit, wherein the paging unit is to translate a linear address to a physical address using a page table hierarchy, and the region may be designated as user memory by a flag at any level in the page table hierarchy;
and wherein the execution unit is also to execute a processor identification instruction by returning an indication that the processor includes control logic to prevent the processor from executing from user memory when the processor is in supervisor mode.

6. The method of claim 5, wherein attempting includes attempting to fetch the instruction from memory, and preventing includes preventing fetching the instruction from user memory.

7. The method of claim 5, wherein preventing includes causing a fault.

8. The method of claim 5, further comprising executing a processor identification instruction to determine that the processor supports preventing execution from user memory when in supervisor mode.

9. The method of claim 5, further comprising writing to a control register to enable prevention of execution from user mode when the processor is in supervisor mode.

10. The method of claim 5, further comprising attempting, by the processor running in user mode, to execute the instruction.

11. The method of claim 10, further comprising allowing the processor running in user mode to execute the instruction.

12. The method of claim 10, wherein attempting, by the processor running in user mode, to execute the instruction includes attempting, by the processor running in user mode, to fetch the instruction.

13. The method of claim 11, wherein allowing the processor running in user mode to execute the instruction includes allowing the processor running in user mode to fetch the instruction.

14. A system comprising:
a memory, including a region of user memory; and
a processor coupled to the memory, including execution hardware to execute an instruction,
control logic to prevent the execution hardware from executing the instruction when the instruction is stored in user memory and the processor is in supervisor mode;
a paging unit, wherein the paging unit is to translate a linear address to a physical address using a page table hierarchy, and the region may be designated as user memory by a flag at any level in the page table hierarchy;
and wherein the execution unit is also to execute a processor identification instruction by returning an indication that the processor includes control logic to prevent the processor from executing from user memory when the processor is in supervisor mode.

15. The system of claim 14, wherein the processor also includes instruction hardware to fetch the instruction, wherein the control logic is to prevent the execution hardware from executing the instruction by preventing the instruction hardware from fetching the instruction from user memory when the processor is in supervisor mode.

16. The system of claim 14, wherein the processor is in supervisor mode when executing software in a privilege level higher than a lowest privilege level.

17. The system of claim 14, wherein the memory is accessible as a plurality of pages, and user memory includes a subset of the plurality of pages.

* * * * *